United States Patent
Blanksteen

(10) Patent No.: US 9,058,813 B1
(45) Date of Patent: Jun. 16, 2015

(54) AUTOMATED REMOVAL OF PERSONALLY IDENTIFIABLE INFORMATION

(71) Applicant: Scott I. Blanksteen, Issaquah, WA (US)

(72) Inventor: Scott I. Blanksteen, Issaquah, WA (US)

(73) Assignee: Rawles LLC, Wilmington, DE (US)

( * ) Notice: Subject to any disclaimer, the term of this patent is extended or adjusted under 35 U.S.C. 154(b) by 105 days.

(21) Appl. No.: 13/624,755

(22) Filed: Sep. 21, 2012

(51) Int. Cl.
  *G10L 15/00* (2013.01)
  *G10L 15/18* (2013.01)
  *G10L 15/06* (2013.01)
  *G10L 15/19* (2013.01)

(52) U.S. Cl.
  CPC ...................................... *G10L 15/19* (2013.01)

(58) Field of Classification Search
  USPC .......................... 704/1, 9, 231–257, 270–275
  See application file for complete search history.

(56) References Cited

U.S. PATENT DOCUMENTS

| | | | |
|---|---|---|---|
| 7,418,392 B1 | 8/2008 | Mozer et al. | |
| 7,720,683 B1 | 5/2010 | Vermeulen et al. | |
| 7,774,204 B2 | 8/2010 | Mozer et al. | |
| 8,374,865 B1* | 2/2013 | Biadsy et al. | 704/243 |
| 2002/0091975 A1* | 7/2002 | Redlich et al. | 714/699 |
| 2005/0251865 A1* | 11/2005 | Mont et al. | 726/26 |
| 2008/0118150 A1* | 5/2008 | Balakrishnan et al. | 382/176 |
| 2010/0306854 A1* | 12/2010 | Neergaard | 726/26 |
| 2011/0218798 A1* | 9/2011 | Gavalda | 704/201 |
| 2012/0223885 A1 | 9/2012 | Perez | |

FOREIGN PATENT DOCUMENTS

WO  WO2011088053  7/2011

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

* cited by examiner

*Primary Examiner* — Jesse Pullias
(74) *Attorney, Agent, or Firm* — Lee & Hayes, PLLC

(57) ABSTRACT

A natural language system may receive user-input. The user-input may include personal or restrictable information. The natural language system may provide a dual processing system. The natural language system may store a true copy of the user-input, which may include the personal or restrictable information. The natural language system may also generate an obfuscated copy of the user-input that does not contain personal or restricted information. The true copy of the user-input may be stored in a secure storage system and may be retrieved by authorized personnel, which may include the user who provided the user-input. The obfuscated copy of the user-input may be stored in a storage system and may be employed in ongoing training of the natural language system.

20 Claims, 5 Drawing Sheets

AUTOMATED REMOVAL OF PERSONALLY IDENTIFIABLE INFORMATION

BACKGROUND

A natural language interface is a feature of many modern services such as search engines, notification services, and customer service to name a few. The natural language interface allows a user to provide user-input in natural or conversational manner. Rather than provide the user-input in a structured manner that is specified by the service, a user may simply "converse" with the service—i.e., the user may provide the user-input, which in some instances may be speech or may be text, to the natural language interface as if the user were conversing with another human. Such natural language interfaces may be taught using machine learning techniques.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Overview

This disclosure describes systems and techniques for processing natural language user-input data and for training a natural language system. As described below, a user may sometimes send user-input, which may be in a format such as text format or audio format, to a natural language system. This user-input may include personal information (e.g., "Remind me to call Uncle Joe at 206-555-1234" or "Pick up Sally's prescription for Atavan at the drug store on Friday"). Other non-limiting examples of personal information may include, among other things, a credit card number, a birth date, a telephone number, an address, an account ID or password, a personal identifier such as a social security number.

The user-input may be highly valuable for its content in "training" and/or optimizing the natural language system's understanding of a language. However, it may be desirable to protect the personal information included in the user-input in some manner. Thus, the natural language system may automatically obfuscate personal information contained in the user-input and store obfuscated user-input data for use in certain future analysis and processing. In some embodiments, when the user-input data is speech, the original spoken utterance may be stored and a transcribed version, in which personal information has been obfuscated, may be stored separately for analysis and optimization.

In some embodiments, the original version of the user-input, whether spoken or typed, is stored under an enhanced level of security and obfuscated user-input may be stored at a lesser security level.

Illustrative Environment

Figure 1:
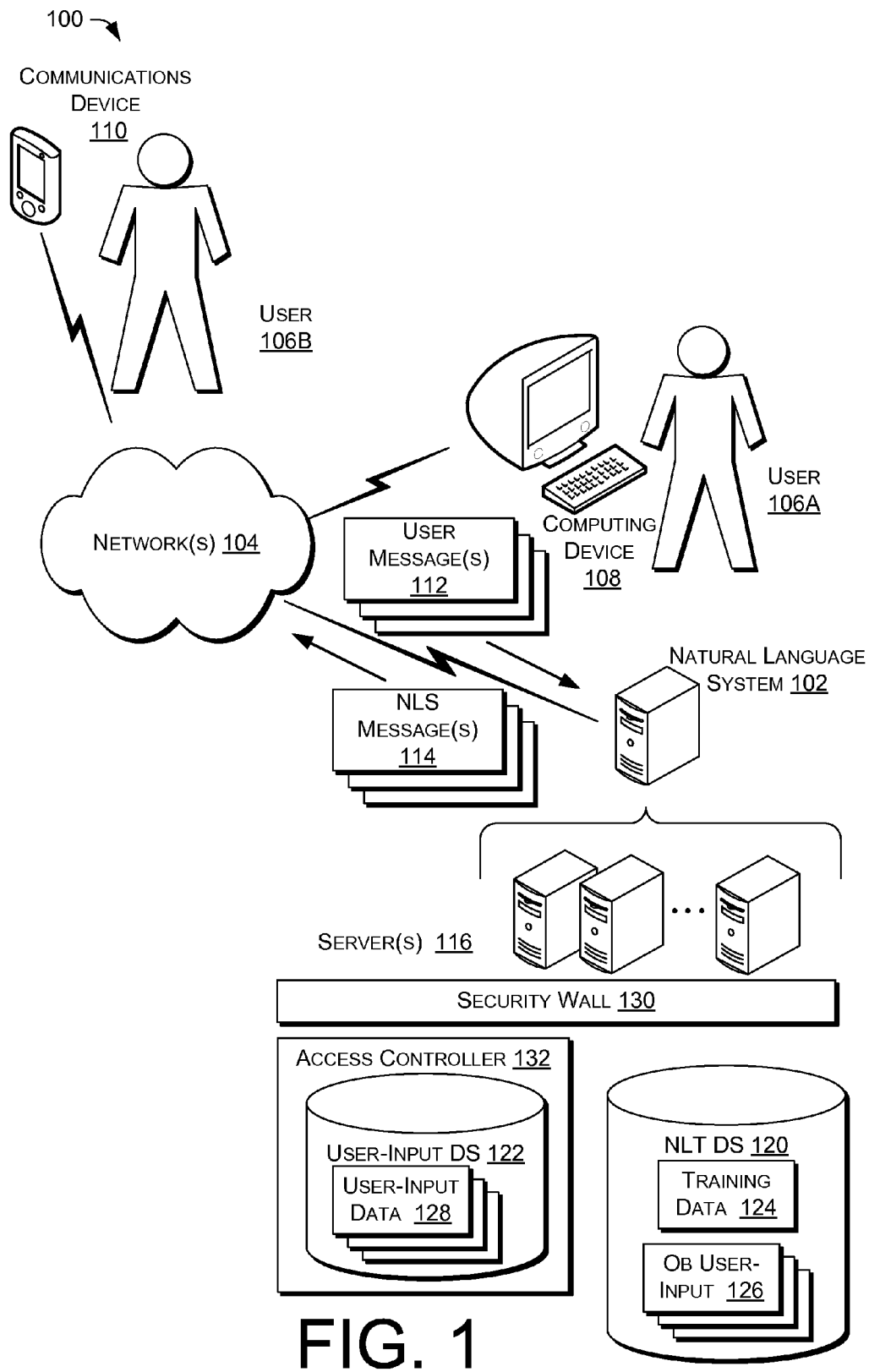
FIG. 1 illustrates an environment in which a user may interact with a natural language system.

FIG. 1 shows an illustrative environment 100 in which the described techniques may be performed. The environment 100 includes a natural language system 102 that is communicatively coupled to one or more network(s) 104. The network(s) 104 may include wired and/or wireless networks that enable communications between the various entities in the environment 100. In some embodiments, the network(s) 104 may include local area networks (LANs), wide area networks (WAN), mobile telephone networks (MTNs), and other types of networks, possibly used in conjunction with one another, to facilitate communication between the natural language system 102 and users, individually referenced as 106A and 106B and collectively referenced as 106.

A user 106 may use a computing device 108 or a communications device 110 to provide user message(s) 112 to the natural language system 102. The computing device 108 may be, among other things, a personal computer (such as desktop or a laptop computer) or any other computing device that includes connectivity to the network(s) 104, and the communications device 110 may be, among other things, a telephonic device (such as a landline telephone, a mobile telephone, a smart phone, etc.), a tablet computer, a netbook, a personal digital assistance (PDA), a gaming device, a media player, or any other communications device that includes connectivity to the network(s) 104. Of course, some computing devices may comprise communication devices and vice versa.

A user message 112 may be a text message or a voice message that includes speech uttered by the user 106. In some instances, a user message 112 may also include an image that contains text, where the image may be processed to extract the text. For example, the communications device 110 may include a camera with which the user 106B may acquire an image and include the image in a user message 112.

The natural language system 102 may provide natural language system (NLS) message(s) 114 to the devices (computing device 108 and/or communications device 110) of the users 106. The network 104 may carry the user message(s) 112 and the NLS message(s) 114 between the natural language system 102 and the devices of the users 106.

The natural language system 102 may include one or more servers 116, a natural language training (NLT) datastore (DS) 118, and a user-input datastore (DS) 120. The natural language training (NLT) datastore (DS) 118 may include training data 122 and obfuscated user-input data 124. The training data 122 may be of relatively small size and be difficult and/or expensive to acquire and may include data that may be used for an initial training of the natural language system 102. In contrast, the obfuscated user-input data 124 is obtained by the natural languages system 102 from the users 106 and the amount of obfuscated user-input data 124 may grow over time. The obfuscated user-input data 124 may include data that may be used for ongoing training of the natural language system 102.

The user-input datastore (DS) 120 may store user-input data 126, which may be carried to the natural language system 102 via user messages 112. In some instances, user-input data 126 may include restrictable information.

The natural language system 102 may include a security wall 128. The user-input datastore (DS) 120 and, in some instances, the natural language training (NLT) datastore (DS) 118 may be behind the security wall 128, which may be a firewall or other security device/feature. The security wall 128 may prevent unauthorized access, via network(s) 104, to components (such as the user-input datastore (DS) 120 and/or the natural language training (NLT) datastore (DS) 118 of the natural language system 102.

The natural language system 102 may also include an access controller 130. The access controller 130 may limit access to the user-input datastore (DS) 120. In some instances, access to the user-input datastore (DS) 120 may be limited to personnel that have valid credentials such as a valid user identification in which user identification may include a user login name and password. In some instances, the user-input data 126 may be stored in the user-input datastore 120 in encrypted format.

The natural language system 102 may provide an interface between the users 106 and applications, features and services provided by one or more of the servers 116. For example, the servers 116 may provide, among other things, search services. A user message 112 may contain a natural language query (e.g., "what is today's date"), and the natural language system 102 may process the query to understand the query (e.g., "date" refers to a day specified in the current month and does not refer to a fruit) and may provide a search query to one or more of the servers 116. The natural language system 102 may provide search results, which may be in natural language format, to the user 106 via NLS messages 114.

As another example, the natural language system 102 may provide an interface between the users 106 and a notification service. A user message 112 may contain a natural language note (e.g., "Remind me to call Uncle Joe at 206-555-1234" or "Pick up Sally's prescription for Atavan at the drug store on Friday"). The natural language system 102 may provide the reminder, which may be in natural language format, to the user 106 via NLS messages 114.

In some instances, a user message 112 may include information that a user 106 may want to be kept confidential. For example, a user 106 may want "Uncle Joe" and Uncle Joe's telephone number ("206-555-1234") in the message "Remind me to call Uncle Joe at 206-555-1234" to be kept confidential.

In some instances, an entity that controls the natural language system 102 may want information to be kept confidential. For example, the entity that controls the natural language system 102 may have a User Privacy Policy Agreement that provides an agreement between the entity and the users 106 for establishing procedures for how user data may be employed, stored, shared, etc. As another example, the entity that controls the natural language system 102 may agree to a User Privacy Policy Agreement with third parties (e.g., regulatory entities) that provides an agreement for establishing procedures for how user data may be employed, stored, shared, etc. Thus, in some instances, the entity that controls the natural language system 102 may want to keep some information in a user message 112 confidential regardless of whether the user 106 who provides the information is concerned about whether the information is kept confidential.

The natural language system 102 may identify restrictable information in the user messages 112. When the natural language system 102 identifies a user message 112 that includes restrictable information, the natural language system 102 may, in some instances, obfuscate the restrictable information and may provide an obfuscated version of the user message 112 to the natural language training datastore 118, which may then be stored in the natural language training datastore 118 as obfuscated user-input 124.

In some embodiments, the natural language system 102 may process user messages 112 and transcribe speech to text. The natural language system 102 may obfuscate any restrictable information in the text version of the user message 112 and may provide the obfuscated text to the natural language training datastore 118. The obfuscated text may then be stored in the natural language training datastore 118 as obfuscated user-input 124.

The natural language system 102 may provide at least a portion of user messages 112 to the user-input datastore 120, which may then be stored as user-input data 126. In some instances, user-input data 126 may be in a text format or may be in an audio format.

Illustrative Natural Language System

Figure 2:
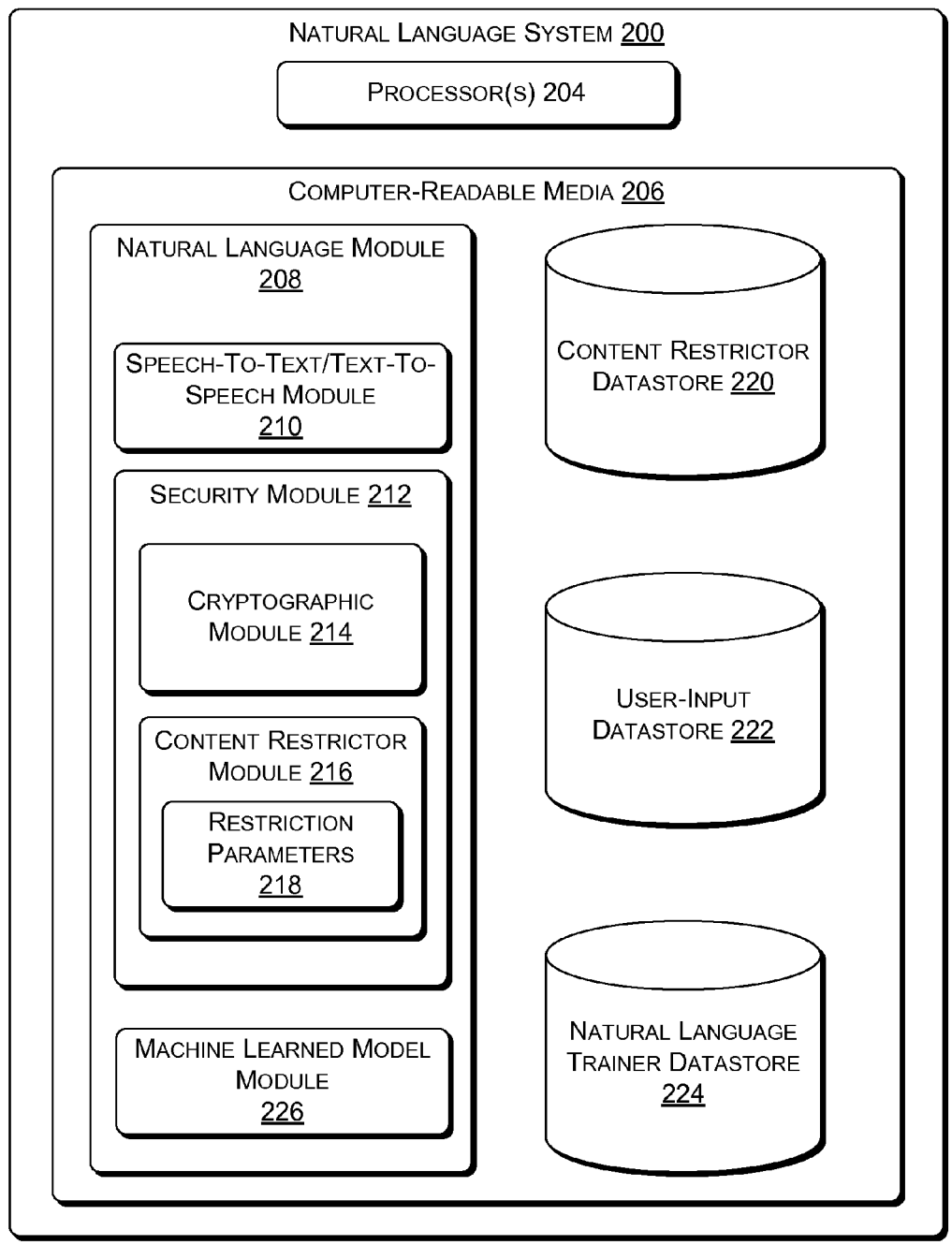
FIG. 2 illustrates an example block diagram of a natural language system.

FIG. 2 a block diagram of a natural language system 202 such as might be used in conjunction with the techniques described herein. The natural language system 202 includes one or more processors 204 and computer-readable media 206. The processors 204 may be configured to execute instructions, which may be stored in the computer-readable media 206 or in other computer-readable media accessible to the processors 204.

The computer-readable media 206, meanwhile, may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by the natural language system 102. The computer-readable media 206 may reside within a housing of the natural language system 102, on one or more storage devices accessible on a local network, on cloud storage accessible via a wide area network, or in any other accessible location.

The computer-readable media 206 may store several modules, such as instructions, datastores, and so forth that are configured to execute on the processors 204. For instance, the computer-readable media 206 may store a natural language module 208. The natural language module 208, when executed by the processor(s) 204, may have natural language understanding and may provide a natural language interface between users 106 and computer implemented applications and/or services.

The natural language module 208 may include a speech-to-text/text-to-speech module 210. The speech-to-text/text-to-speech module 210 may convert speech (including natural language speech) to text and vice versa. In some embodiments, functionality of the speech-to-text/text-to-speech module 210 may be distributed among multiple modules. As one non-limiting example, a first module may include speech-to-text functionality and a second module may include text-to-speech module. In some instances, human speech, which may be carried in user messages 112, may be transcribed to text and the text may be provided to a security module 212. In some instances, the speech-to-text/text-to-speech module 210 may convert content from text files into speech, which may then be provided to humans. In some instances, the natural language module 208 may provide the speech to users 106, via natural language system messages 114. In some instances, the natural language module 208 may provide the speech to agents of the entity that controls the natural language system 202 for, among other things, training of the agents and/or quality control purposes.

The security module 212 may include a cryptographic module 214 and a content restrictor module 216. The cryptographic module 214 may encrypt and decrypt input. Input to the cryptographic module 214 for encryption may include audio content carried in a user message 112, text content carried in a user message 112, and a text transcription of audio content carried in a user message 112. The content restrictor module 216 may obfuscate content that corresponds to restrictable information. The content restrictor module 216 may include restriction parameters 218. The restriction parameters 218 may indicate what user-input data should be restricted. The restriction parameters 218 may correspond to a User Privacy Policy Agreement. In some instances, content restriction parameters 218 may include parameters that are learned by way of machine learning techniques.

The computer-readable media 206 may also store one or more datastores such as a content restrictor datastore 220, a user-input datastore 222, and a natural language training datastore 224. The natural language training datastore 224 may store training data and obfuscated user-input data, and the user-input datastore 222 may store user-input data and/or encrypted output of the cryptographic module 214. In some instances, the user-input datastore 222 may store user profiles, user contacts (e.g., address books of users 106), user calendars, and other user information.

The content restrictor datastore 220 may store, among other things, dictionaries and tables. Non-limiting examples of dictionaries that may be stored in the content restrictor database 220 include restricted word dictionaries and key-word/phrase dictionaries. A restricted word dictionary may provide a list of words or phrases that may be, generally, restricted. As one example, names, and nicknames, of people may be restrictable words. As another example, geographical names such as street names, city names, etc. may be restrictable words. A key-word/phrase dictionary may provide a list of words and/or phrases that provide an indication that restrictable information may be included in user-input data. Example words and phrases that may be included in a key-word/phrase dictionary may include names of financial institutions such as credit card companies and/or banks, "account," "address," "card," "e-mail," "number," "password," "telephone," "[his/her/my/our/your/their] address," "credit card," "bank account," "social security number," "zip code," etc. Tables that may be stored in the content restrictor datastore 220 may include structure tables, which may provide structures for restrictable information. For example, a structure table may indicate that a "social security number" has 9 digits, a "telephone number (for a telephone having a United States of America telephone number)" may have 7 digits (e.g., "555-1234"), 10 digits (e.g., "206-555-1234"), or 11 digits ("1-206-555-1234"), an "international telephone call" may start with the digits "01" or "00" or other international call prefix, a "zip code" may have 5 digits (e.g., "98101") or 9 digits (e.g., "98101-3925"), etc.

In some instances, the restriction parameters 218 may override user-input for selections of restrictable information. For example, in some embodiments, a user profile may indicate that a user 106 has selected that certain information such as contact information for the user need not be kept confidential. However, the restriction parameters 218 may override a user's selection based at least on factors such as, but not limited to, geographic information of the user (for example, different geographical entities, such as countries, may have different privacy requirements, which may or may not be waivable by the user, for User Privacy Policies), user age (for example, the entity that controls the natural language system 102 may determine to restrict user contact information for users who are below a given age), etc.

In some embodiments, the natural language module 208 may receive a user message 112. In some instances, the user message 112 may include a text message and/or an image that includes text, and in other instances, the user message 112 may include an audio message. In either case, content provided in the user message may be expressed as natural language. In some instances, the user message 112 may be provided to the speech-to-text/text-to-speech module 210, which may convert audio content carried in the user message 112 into a corresponding text transcription of the audio content.

In some instances, the speech-to-text/text-to-speech module 210 may receive a text message and may convert the content of the text message into an audio format. The content, in audio format, may be provided to a user 106 via a natural language system (NLS) message 114 or to authorized personnel of the entity that controls the natural language system 202. For example, a user 106 may receive a language system (NLS) message 114 with an audio message saying "Don't forget to call Uncle Joe at 206-555-1234."

The security module 212 receives an input, which may be from the speech-to-text/text-to-speech module 210 and/or may be at least a portion of a user message 112 and/or data from the user-input datastore 222. In some instances, the input may be a text file from the speech-to-text/text-to-speech module 210 (such as a text transcription of audio content carried in a user message 112) or may be text carried in a user message 112. However, in some embodiments, the security module 212 may also have voice recognition functionality and may process audio content. In such embodiments, inputs to the security module 212 may also include audio content carried in a user message 112. In some instances, input to the security module 212 may also be provided by the user-input datastore 222 and may include data that is encrypted.

In some embodiments, the security module 212 may temporarily store input (e.g., user message 112, a text transcription of the audio content) in a buffer. The cryptographic module 214 may receive and encrypt a true copy of the input and may provided the encrypted true copy of the input to the user-input datastore 222.

In some instances, encrypted data from the user-input datastore 222 may be received by the cryptographic module 214. The cryptographic module 214 may decrypt the encrypted data. In some instance, the data, unencrypted, may be provided to the content restrictor module 216. In some instances, the data, unencrypted, may be provided to the speech-to-text/text-to-speech module 210 and/or to the user 106 via a natural language system (NLS) message 114.

The content restrictor module 216 may receive a copy of input to the security module 212. The content restrictor module 216 may identify candidate restrictable information in the input based at least on data included in the content restrictor database 220. In some embodiments, the content restrictor module 216 may employ one or more dictionaries to identify candidate restrictable information such as word-strings, where a word-string may be comprised of one or more words. In some embodiments, the content restrictor module 216 may employ one or more tables to identify candidate restrictable word-strings. In some embodiments, the content restrictor 216 may employ one or more dictionaries to identify flags for candidate restrictable word-strings. The content restrictor module 216 may determine whether candidate restrictable information is restricted information, and if so, the content restrictor module 216 may obfuscate the restricted information. The content restrictor module 216 may obfuscate the restricted information and provide the natural language training datastore 224 with obfuscated user-input data. The content restrictor module 216 may obfuscate the restricted information by, among other things, omitting the restricted information from the obfuscated user-input data and/or replacing, in the obfuscated user-input data, the restricted information with non-restricted information.

In some embodiments, the content restrictor module 216 may determine whether candidate restrictable information is restricted information based at least in part on a context of the input. For example, assume the input to the content restrictor 216 may include the phrase "my visa to Nigeria has been approved." The content restrictor 216 may identify the word "visa" as a candidate restrictable word, and such a determination may be based at least in part the word "visa" being included in a restricted word/phrase dictionary and/or a keyword/phrase dictionary. The content restrictor 216 may determine that the word "visa," in this context, refers to a travel document, not to a credit card or other financial service. In this example, the content restrictor module 216 may determine that the word "visa" is not restricted information based, at least in part, on the context of the input. (However, the content restrictor module 216 may determine that the word "Nigeria" is restricted information.)

In some embodiments, the content restrictor module 216 may identify candidate restricted information and/or determine that candidate restricted information is restricted information based at least in part on user-input data. For example, a calendar of a user 106, or an address book of a user, among other things, may be used by the content restrictor module 216 to identify candidate restricted information and/or determine that candidate restricted information is restricted information.

As another example, assume the input to the content restrictor 216 may include the phrase "my telephone number is 206-555-1234." The content restrictor module 216 may identify the phrase "telephone number" as a flag for candidate restrictable information and may then look for a sequence of numbers within the user-input, and upon finding such a sequence, the content restrictor module 216 may then determine whether the structure of the sequence of numbers (e.g., 10 digits) matches a structure for a telephone number. Upon determining that the input includes a telephone number, the content restrictor module 216 may then determine that the sequence of numbers is restricted information. In that case, the content restrictor module 216 may obfuscate the telephone number.

In some embodiments, the natural language module 208 may include a machine learned model module 226. The machine learned model module 226 may be trained, in part or in whole, using data from the natural language training datastore 224.

Illustrative Processes

The processes described in this disclosure may be implemented by the devices described herein, or by other devices. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other devices as well.

Figure 3:
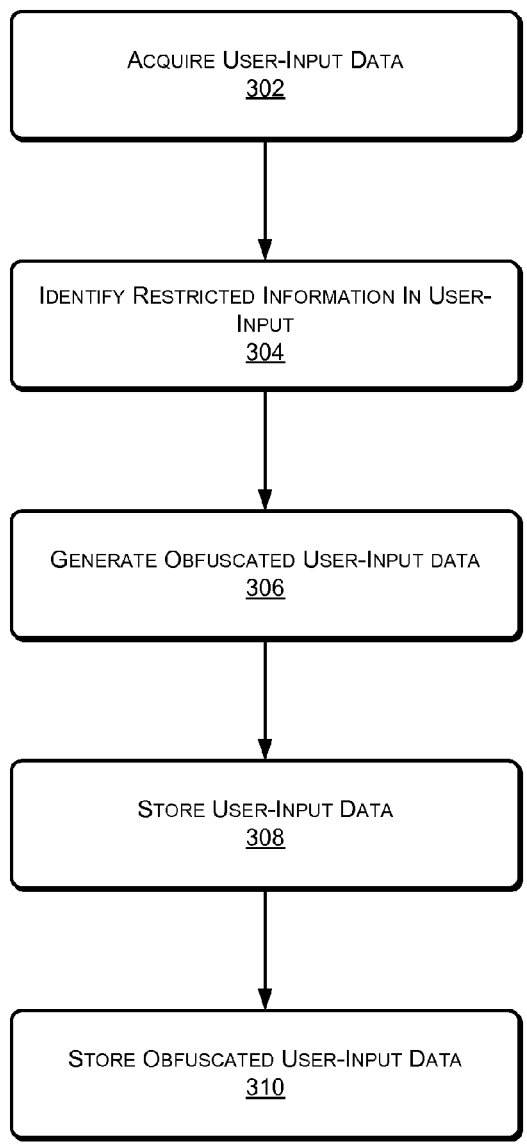
FIG. 3 is an example process of processing user-input using a natural language system.

FIG. 3 is an example process 300 of processing user-input using the natural language system 102, 202.

At 302, the natural language system 102, 202 may acquire user-input data. In some instances, user-input data may include data such as calendar(s), information for contacts (e.g., address book) and such data may be stored in the user-input datastore 120, 222. In some instances, user-input data may include content carried in user-messages 112. The content may be in a text format or an audio format.

At 304, the natural language system 102, 202 may identify restricted information in the user-input data. In some instances, the natural language system 102, 202 may identify words or phrases in the user-input data that are restricted. The natural language system 102, 202 may identify words or phrases in the user-input data that are restrictable information candidates. The natural language system 102, 202 may determine, for each restrictable information candidate, whether a restrictable information candidate conveys restricted information based at least in part on, one or more of: (a) a context, within the user-input data, of the restrictable information candidate; (b) a structure of the restrictable information candidate; (c) whether the restrictable information candidate matches to a restricted word and/or restricted phrase; (d) whether the restrictable information candidate is within a given distance (e.g., within 5 words, 1 sentence, etc.) to an indicator of restrictable information; (e) user-data (e.g., a user's calendar and/or address book); (f) one or more dictionaries of restricted words and/or phrases; (g) one or more dictionaries of keywords and/or phrases that are indicative of a presence of restricted information; and (i) one or more structure tables which provide a structure for restricted information.

At 306, the natural language system 102, 202 may generate obfuscated user-input data. In some embodiments, the natural language system 102, 202 may generate a true copy of the user-input data and may obfuscate restricted information in the true copy by deleting the restricted information therefrom. In some embodiments, the natural language system 102, 202 may generate a partial copy of the user-input data and may obfuscate restricted information by omitting the restricted information from the copy—i.e., the restricted information is never included in the partial copy of the user-input. In some embodiments, the natural language system 102, 202 may generate obfuscated user-data by replacing restricted information with non-restricted information.

At 308, the natural language system 102, 202 may store the user-input data in a user-input datastore 120, 222. In some embodiments, the natural language system 102, 202 may encrypt the user-input data prior to storing the user-input data in the user-input datastore 120, 222.

At 310, the natural language system 102, 202 may store the obfuscated user-input data in a natural language training datastore 118, 224.

Figure 4:
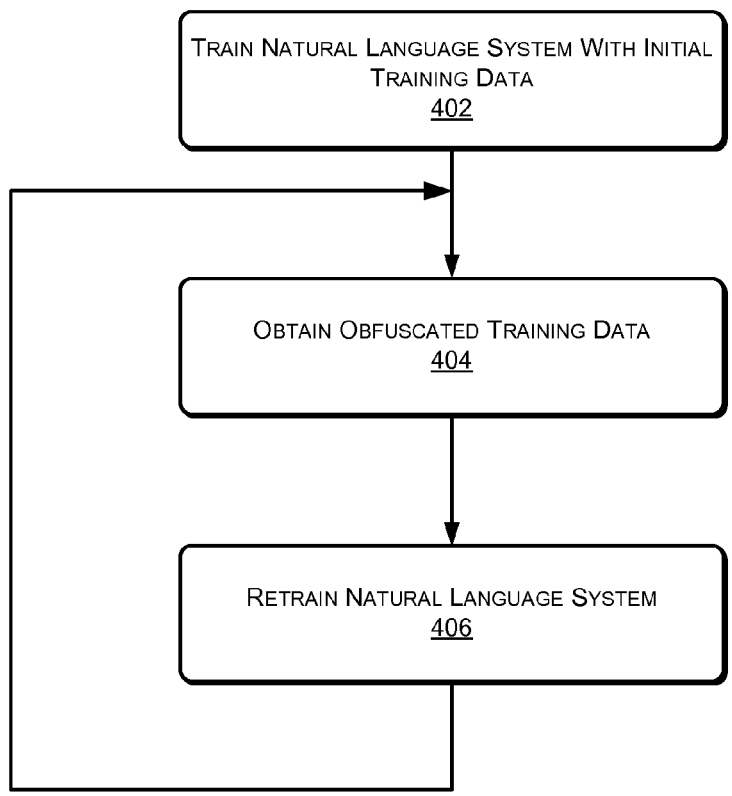
FIG. 4 is an example process of training of a natural language system.

FIG. 4 is an example process 400 of training the natural language system 102, 202.

At 402, the natural language system 102, 202 may be trained, using machine learning techniques, with initial training data.

At 404, the natural language system 102, 202 may obtain obfuscated training data. The obfuscated training data may be obtained by receiving user-input data and obfuscating restricted information, if any exists, in the user-input data.

At 406, the natural language system 102, 202 may be retrained, using machine learning techniques, with training data that may include the obfuscated training data and may the initial training data. As the natural language system 102, 202 remains in operation, it will receive more and more user-input data, and over time, the amount of obfuscated training data will grow. In some instances, the amount of obfuscated training data that is available for training the natural language system 102, 202 may be sufficiently large that only a portion of the obfuscated training data is utilized for training. In some instances, the obfuscated training data may expire over time so that only obfuscated training that has not expired is utilized in training the natural language system 102, 202.

Figure 5:
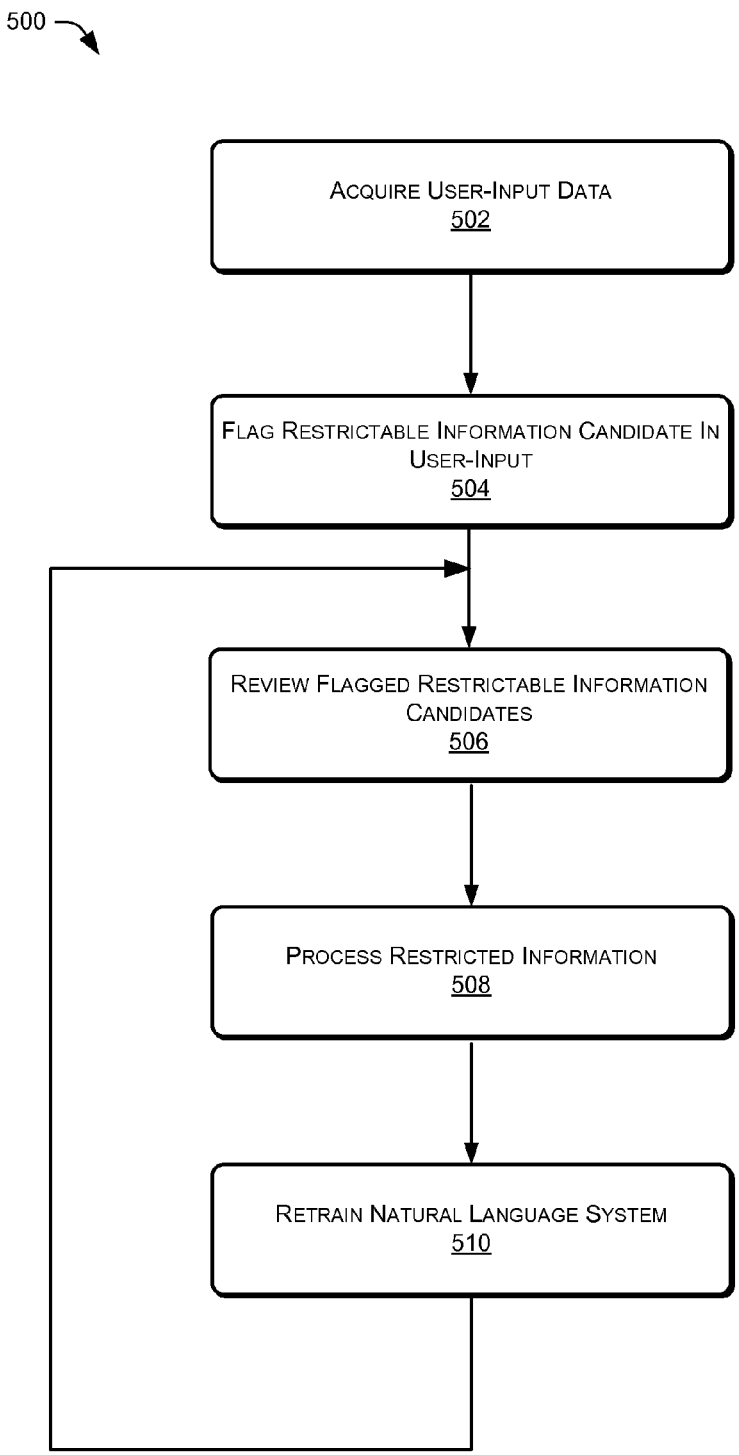
FIG. 5 is another example process of training of a natural language system.

FIG. 5 is another example process 500 of training the natural language system 102, 202.

At 502, the natural language system 102, 202 may acquire user-input data. In some instances, the user-input data may be retrieved from the user-input datastore 120, 222. In some instances, the user-input data may be carried in user message(s) 112.

At 504, the natural language system 102, 202 may flag candidate restrictable information in the user-input data. In some embodiments, the natural language system 102, 202 may determine that information in the user-input data should be flagged as candidate restrictable information if the natural language system 102, 202 cannot determine that the information is not restricted. In some embodiments, the natural language system 102, 202 may determine that information in the user-input data should be flagged as candidate restrictable information based at least in part on the natural language system 102, 202 failing to understand a context of the information. For example, assume the user-input data included the phrase "my telephone number is 'ACE 1234'." Then the natural language system 102, 202 may determine that "telephone number" is an indicator of restricted information, but the natural language system 102, 202 might be unable to find a phrase that has a structure that corresponds to a telephone number. In this case, the natural language system 102, 202 may flag the user-input data as containing candidate restrictable information.

In some embodiments, the natural language system 102, 202 may determine that information in the user-input data should be flagged as candidate restrictable information based at least in part on geographical information. For example, the natural language system 102, 202 may determine that a given word (e.g., "close") may be commonly used in addresses in a geographical region (e.g., Britain). The natural language system 102, 202 may then flag that given word in the user-input data as containing a restrictable information candidate.

In some embodiments, the natural language system 102, 202 may determine that information in the user-input data should be flagged as candidate restrictable information based at least in part on a structure of the candidate restrictable information. For example, the natural language system 102, 202 may find in the user-input data a sequence of numbers in close proximity to the words "credit card," but this sequence of numbers may have a structure is not currently recognized as corresponding to restricted information. The natural language system 102, 202 may then flag the sequence of numbers in the user-input data as containing candidate restrictable information.

In some embodiments, the natural language system 102, 202 may determine that information in spoken user-input data should be flagged as candidate restrictable information based at least in on a cadence of the candidate restrictable information. For example, different users may utter different strings of numbers with a similar cadence when referring to a common thing. As a non-limiting example, users may utter social security numbers, which consists of nine digits, as three separate strings of numbers, where a pause between two strings is greater than a pause between two numbers in the same string.

At 506, the flagged restrictable information candidates are reviewed and if the flagged restrictable information candidates contain restricted information, then they are tagged as restricted information. The flagged restrictable information candidates may be reviewed by authorized personnel of the entity that controls the natural language system 102, 202. Such personnel may access the user-input data 126 that have flagged restrictable information candidates via the access controller 130. The personnel may apply human reasoning to determine whether the flagged restrictable information candidates do include actual restricted information, and if so, the personnel may tag the restricted information. In one of the above example, a human may determine that the word "ACE" corresponds to the numbers "223" as given by the letters associated with numbers on a telephone and may tag the word "ACE" as corresponding to restricted information.

In one of the above examples, a human may determine that a given credit card may have an account number that is comprised of number of digits that is different from other credit cards. For example, a given credit card may have 15 digits in the account number and other credit cards may have 16 digits in the account number. The human may tag sequences of numbers, in which there are different total amounts of digits, as corresponding to restricted information.

At 508, restricted information, if any, that may be contained the user-input is processed. In some embodiments, the natural language system 102, 202 may generate obfuscated user-input data based at least in part on the tagged restricted information and/or flagged candidate restrictable information. The natural language system 102, 202 may provide the obfuscated user-input data to the natural language training datastore 118, 224.

At 510, the natural language system 102, 202 may be retrained based at least in part on the tagged restricted information and/or flagged candidate restrictable information. The natural language system 102, 202 may update the content restrictor database 220 based at least in part on a retraining, employs the tagged restricted information as training data, of the natural language system 102, 202. As one example, the natural language system 102, 202 may learn that a sequence of X letters (e.g., 3 letters ("ACE")) and Y numbers (e.g., 4 numbers ("1234")) may correspond to a structure of a telephone number consisting of X+Y numbers (e.g., 7 numbers) and may update structure tables stored in the content restrictor database 220 accordingly.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A method of processing natural language communications comprising:
   receiving, via a natural language system, user-input that includes restricted information spoken by a user;
   identifying the restricted information in the user-input, the identifying comprising:
   determining that one or more words of the user-input match one or more words of a restricted string;

determining, at least partly in response to determining that the one or more words of the user-input match the one or more words of the restricted string, a context of the one or more words of the user-input; and determining that the one or more words of the user-input comprise the restricted information based at least in part on the context and based at least in part on the one or more words of the user-input matching the one or more words of the restricted string;

generating obfuscated user-input by removing the restricted information from the user-input;

storing the obfuscated user-input in a datastore; and training the natural language system with training data that includes the obfuscated user-input.

2. The method of claim 1, wherein the restricted information includes at least one of a name of a person, a telephone number, an address, financial information, a birth date, and a personal identifier.

3. The method of claim 1, further comprising:

training the natural language system to recognize restricted information based at least in part on one or more of speech-cadences of restricted information contained in user-inputs, structures of restricted information contained in user-inputs, and flagged information contained in user-inputs, wherein the flagged information corresponds to restricted information that is flagged by humans.

4. A method of processing natural language communications comprising:

identifying, via a natural language system, restricted information in a user-input, the identifying of the restricted information comprising:

identifying a structure of a restrictable-phrase candidate included in the user-input;

comparing the structure of the restrictable-phrase candidate to a restricted structure; and determining that the restrictable-phrase candidate includes the restricted information based at least in part on the comparing of the structure of the restrictable-phrase candidate to the restricted structure;

generating obfuscated user-input in which the restricted information is not discernible;

providing at least a portion of the user-input to a first datastore; and providing the obfuscated user-input to a second datastore.

5. The method of claim 4, further comprising:

retrieving the obfuscated user-input from the second datastore; and training the natural language system with training data that includes at least a portion the obfuscated user-input.

6. The method of claim 4, further comprising:

retrieving the user-input from the first datastore; and training the natural language system with training data that includes at least a portion the user-input.

7. The method of claim 6, further comprising training the natural language system to recognize restricted information based at least in part on one or more of speech-cadences of restricted information contained in user-inputs, structures of restricted information contained in user-inputs, and flagged information contained in user-inputs, wherein the flagged information corresponds to restricted information that is flagged by humans.

8. The method of claim 4, further comprising:

restricting access to the first datastore such that unauthorized personnel of an entity that controls the first datastore are unable to access the user-input.

9. The method of claim 8, further comprising:

providing the user-input to a person that provided the user-input.

10. The method of claim 4, wherein the generating obfuscated user-input includes:

omitting the restricted information from the obfuscated user-input.

11. The method of claim 4, wherein the generating obfuscated user-input includes:

replacing the restricted information with non-restricted information.

12. The method of claim 11, wherein the replacing the restricted information with non-restricted information includes:

determining a context, within the user-input, of the restricted information; and determining the non-restricted information based at least in part on the context of the restricted information.

13. The method of claim 4, wherein the user-input is a first user-input and the obfuscated user-input is a first obfuscated user-input, and further comprising:

employing a machine-learning model that has been trained with training data that includes at least one second obfuscated user-input, wherein the second obfuscated user-input corresponds to a second user-input in which restricted information of the second user-input is obfuscated.

14. The method of claim 4, further comprising:

determining whether a restrictable string candidate is associated with a restricted string;

determining a context, within the user-input, of the restrictable string candidate in response to the restrictable string candidate matching the restricted string; and determining that the restrictable string candidate is a restricted string based at least in part on the context of the restrictable string candidate.

15. The method of claim 4, further comprising:

obtaining user-data that is independent of the user-input;

determining a restrictable-word candidate based at least in part on the user-data;

determining a context, within the user-input, of the restrictable-word candidate; and determining that the restrictable-word candidate is a restricted keyword based at least in part on the context of the restrictable-word candidate.

16. The method of claim 15, wherein the user-input was provided by a user, wherein the user-data comprises data from at least one of an address book of the user, a calendar of the user, and a location of the user.

17. One or more non-transitory computer-readable storage media having computer-executable instructions thereon which, when executed by a computing device, implement a method comprising:

identifying restricted information in a user-input;

determining, from the user-input, a context of the restricted information;

determining, based at least in part on the context of the restricted information, non-restricted information to substitute for the restricted information;

generating an obfuscated user-input by replacing the restricted information in the user-input with the non-restricted information;

providing at least a portion of the user-input to a first datastore; and providing the obfuscated user-input to a second datastore.

18. The one or more non-transitory computer-readable storage media of claim 17, the method further comprising:

retrieving the obfuscated user-input from the second datastore; and training a natural language system with training data that includes at least a portion the obfuscated user-input.

19. A natural language system comprising:
one or more processors; and
one or more computer-readable media storing computer-executable instructions that, when executed by the one or more processors, cause the one or more processors to perform acts comprising:
identifying restricted information in a user-input;
determining, from the user-input, a context of the restricted information;
determining, based at least in part on the context of the restricted information, non-restricted information to substitute for the restricted information;
generating an obfuscated user-input by replacing the restricted information in the user-input with the non-restricted information;
providing at least a portion of the user-input to a first datastore; and
providing the obfuscated user-input to a second datastore.

20. The natural language system of claim 19, the acts further comprising:
retrieving the obfuscated user-input from the second datastore; and
training a natural language system with training data that includes at least a portion the obfuscated user-input.

* * * * *